United States Patent
Poirier et al.

(10) Patent No.: US 7,150,478 B2
(45) Date of Patent: Dec. 19, 2006

(54) INTEGRATED SEAL FOR TUBE TO HOSE CONNECTION

(75) Inventors: David M. Poirier, Fort Gratiot, MI (US); Jim Kerin, Grosse Pointe Woods, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 0 days.

(21) Appl. No.: 10/893,666

(22) Filed: Jul. 16, 2004

(65) Prior Publication Data

US 2006/0012168 A1    Jan. 19, 2006

(51) Int. Cl.
*F16L 25/00* (2006.01)
(52) U.S. Cl. .................... 285/332.2; 285/347
(58) Field of Classification Search ........... 277/602, 277/608, 604, 607, 617; 285/238, 382, 148.13, 285/347, 423, 422, 332.2, 425, 345
See application file for complete search history.

(56) References Cited

U.S. PATENT DOCUMENTS

| | | | | |
|---|---|---|---|---|
| 3,016,250 | A | * | 1/1962 | Franck ........................ 285/347 |
| 4,570,981 | A | * | 2/1986 | Fournier et al. ......... 285/332.3 |
| 4,603,890 | A | | 8/1986 | Huppee |
| 5,135,268 | A | | 8/1992 | McNaughton et al. |
| 5,261,709 | A | | 11/1993 | McNaughton et al. |
| 5,779,286 | A | | 7/1998 | Kaishio |
| 5,957,163 | A | | 9/1999 | Ito et al. |
| 6,186,558 | B1 | * | 2/2001 | Komolrochanaporn . 285/148.19 |
| 6,773,041 | B1 | * | 8/2004 | Wolff ......................... 285/374 |

* cited by examiner

*Primary Examiner*—Aaron Dunwoody
(74) *Attorney, Agent, or Firm*—Leydig, Voit & Mayer, Ltd

(57) ABSTRACT

A hose connector adapted to have a polymeric hose fitted on the outer periphery of the hose connector. The hose connector comprises a metal tubing and a sealing element. The sealing element includes a ring portion and a resilient member portion attached to the ring portion.

10 Claims, 6 Drawing Sheets

INTEGRATED SEAL FOR TUBE TO HOSE CONNECTION

BACKGROUND OF THE INVENTION

The present invention relates to a hose connector adapted to have a flexible polymeric hose fitted on the outer periphery of the hose connector. More specifically, it relates to a hose connector comprising a sealing element mounted on the end of a metal tubing.

A hose connector formed at the end of a metal tubing is typically used to connect the metal tubing to a flexible polymeric hose. The metal tubing can be part of a long rigid fluid line or a stem defined at the end of a metal connector body. The polymeric hose is fitted on the outer periphery of the hose connector to form a fluid connection between the fluid line or connector body with the polymeric hose. A typical prior art hose connector adapted to have a flexible polymeric hose fitted on the outer periphery of the hose connector is illustrated in FIG. 1. The hose connector 10 has a pair of beads 20, 26 extending radially outward from the remainder of a metal tubing 14. Each bead 20, 26 has a lead-in portion 22, 28 and a slip-out preventive portion 24, 30. The lead-in portions 22, 28 allow the hose 18 to slide axially inward along the outer surface of the metal tubing 14. The slip-out preventive portions 24, 30 enhance the retention of the hose 18 onto the metal tube 14. For this type of hose connector, a fluid tight seal is maintained only by the tightness of the hose 18. Therefore, when creep deformation of the hose occurs due to heat deterioration, the holding force decreases such that a fluid tight seal cannot be maintained. Other factors which contribute to a lack of fluid tight seal include variations in the size and tolerances of the hose connector and the polymeric hose, the inner surface finish of the hose, the outer surface finish of the metal tubing, and the hardness of the hose.

To maintain a fluid tight seal for a long period of time, a resilient O-ring can be installed on the outer surface of the metal tubing such that once the flexible polymeric hose has been positioned over the O-ring, the O-ring will be radially deformed between the hose and the metal tubing to provide a fluid tight seal. Two types of hose connectors having a resilient O-ring installed and retained onto a metal tubing are known and disclosed in prior art references. One such type of hose connectors is illustrated in FIG. 2. The hose connector 10 has an annular channel 132 formed around the outer surface of the metal tubing 114. An O-ring 136 is situated in the annular channel 132. An example of such a hose connector with an annular channel formed around the outer surface of the metal tubing is disclosed in U.S. Pat. No. 5,135,268.

Another type of hose connectors having an O-ring installed and retained onto a metal tubing is illustrated in FIG. 3. The hose connector 210 uses a separate end form 234. The end form 234 is mounted to the end of the metal tubing 214 having an upset 220 formed thereon. The end form 234, along with the upset 220 of the metal tubing 214, forms a channel 232 for an O-ring 236 to be situated therein. An example of such a hose connector with an end form mounted to the end of a metal tubing is disclosed in the U.S. Pat. No. 5,779,286.

While for certain applications, an O-ring installed and retained onto a metal tubing is an improvement over the prior art hose connector illustrated in FIG. 1, it does have several disadvantages. One disadvantage is that during the insertion of the hose connector into the hose, the O-ring may roll out of the channel and is then unable to provide an adequate fluid seal. Another problem associated with using an end form, as illustrated in FIG. 3, is that a component, separate from the sealing element, must be mounted to the end of the metal tubing. This usage of the an end form increases the cost of the hose connector by requiring the manufacturing of a separate end form and the steps of installing the O-ring to the end form and inserting the end form into the metal tubing.

DETAILED DESCRIPTION OF THE DRAWINGS

One embodiment of a hose connector in accordance to the present invention is illustrated in FIGS. 4–7. The hose connector 310 includes a metal tubing 314 and a sealing element 336.

Figure 1:
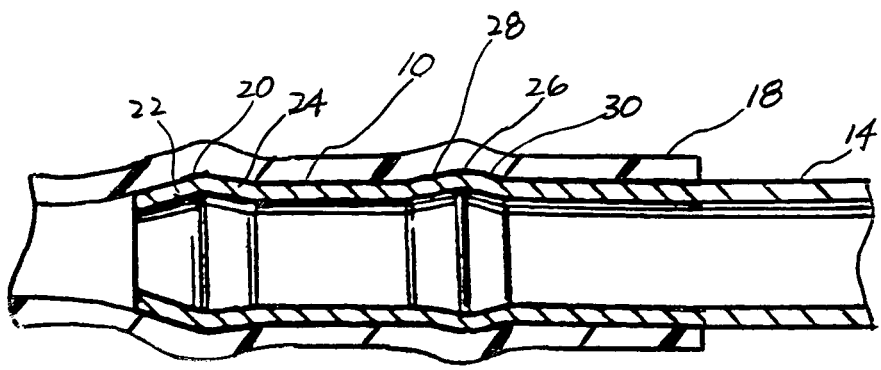
FIG. 1 is a sectional view of a typical prior art hose connector.
Figure 2:
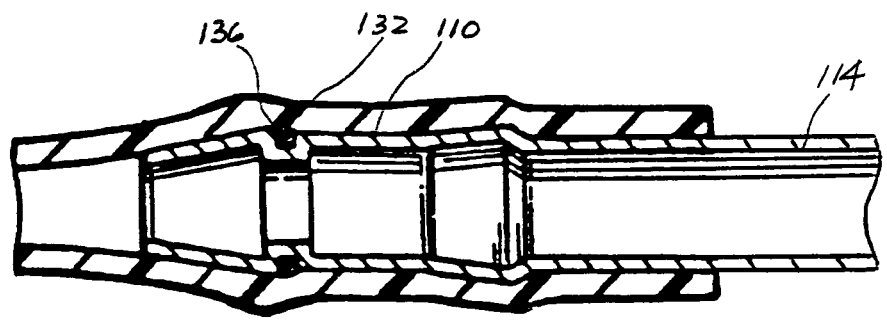
FIG. 2 is a sectional view of a prior art hose connector with an annular channel formed around the outer surface of a metal tubing.
Figure 3:
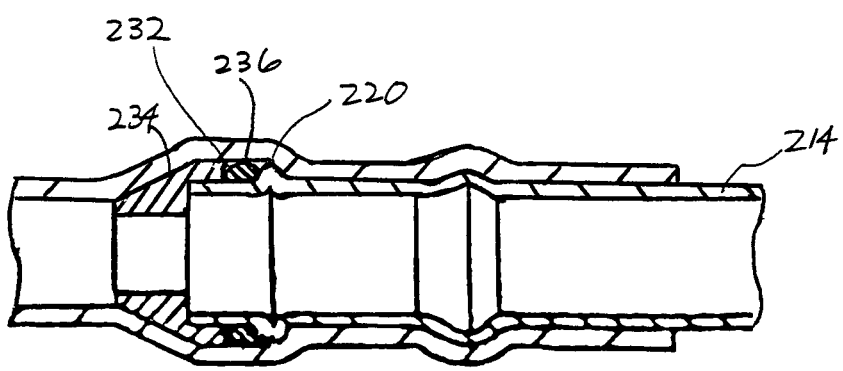
FIG. 3 is a sectional view of a prior art hose connector with an end form mounted to the end of a metal tubing.
Figure 4:
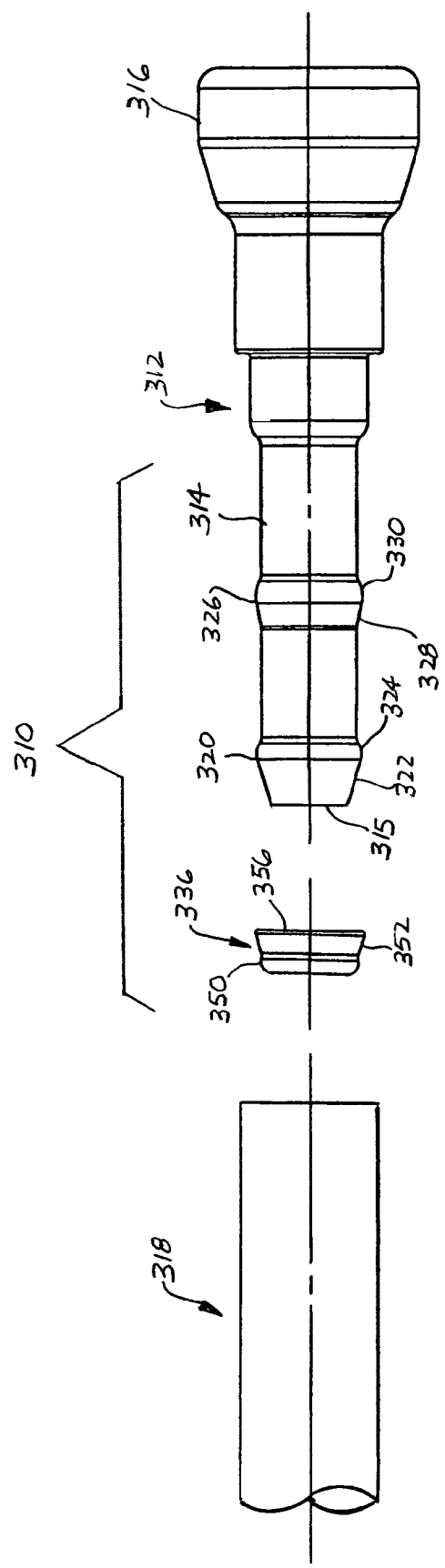
FIG. 4 is a side view of a hose connector as part of a connector body prior to assembling the hose connector.
Figure 5:
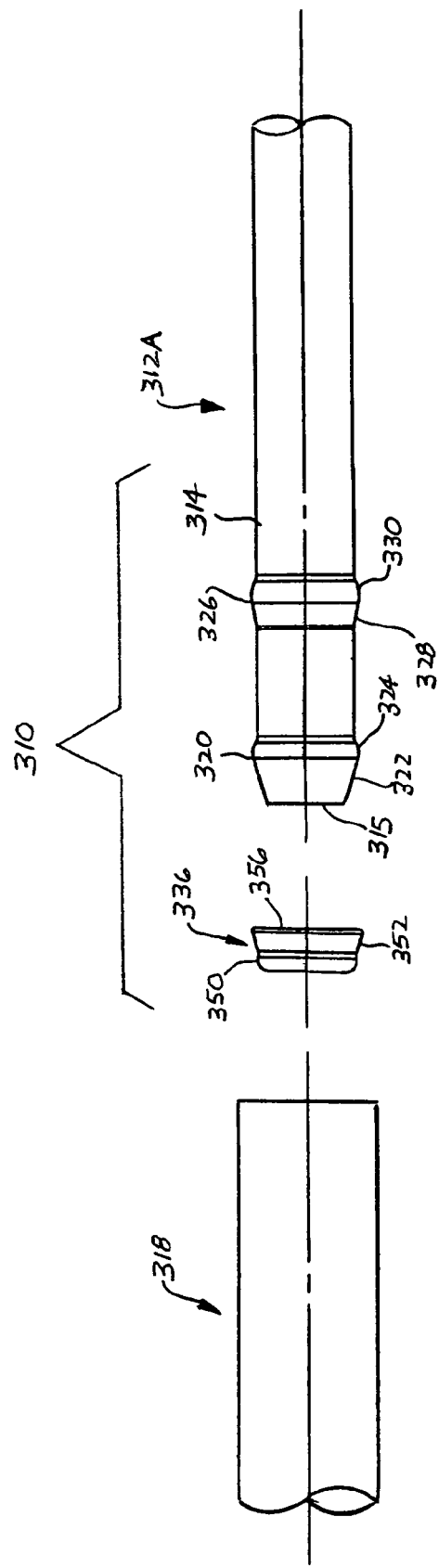
FIG. 5 is a side view of a hose connector as part of a long rigid fluid line prior to assembling the hose connector'
Figure 6:
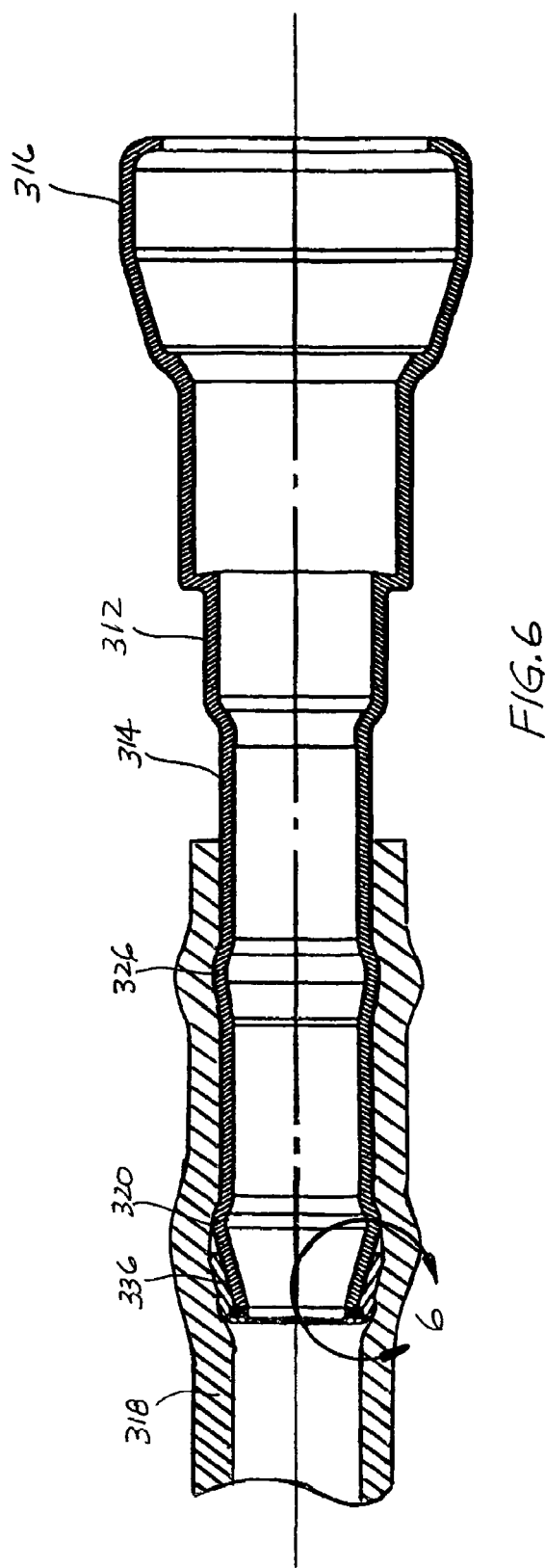
FIG. 6 is a sectional view of a hose connector of FIG. 4 as assembled.

For illustrative purposes, the metal tubing 314 illustrated in FIGS. 4 and 6 is part of a connector body 312. Alternatively, as illustrated in FIG. 5, the metal tubing 314 can be part of a long rigid fluid line 312A with another metal tubing in accordance to the present invention at the other end of the fluid line.

The metal tubing 314 is adapted to be inserted into the end of a flexible polymeric hose 318. The metal tubing 314 has a pair of radially outward extending beads 320, 326. Each bead 320, 326 has a lead-in portion 322, 328 and a slip-out preventive portion 324, 330. For the connector body 312 illustrated in FIGS. 4 and 6, the other end of the connector body 312 is a female housing 316 as disclosed in U.S. Pat. No. 5,135,268, which is herein incorporated by reference.

Figure 7:
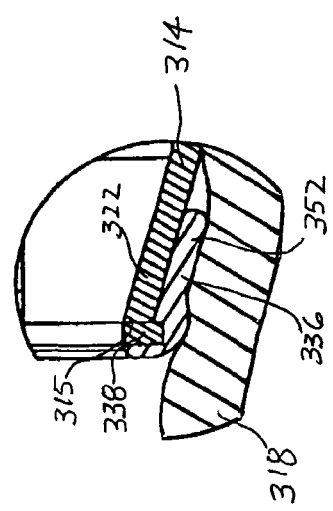
FIG. 7 is an enlarged view of FIG. 6 within circle 7.
Figure 9:
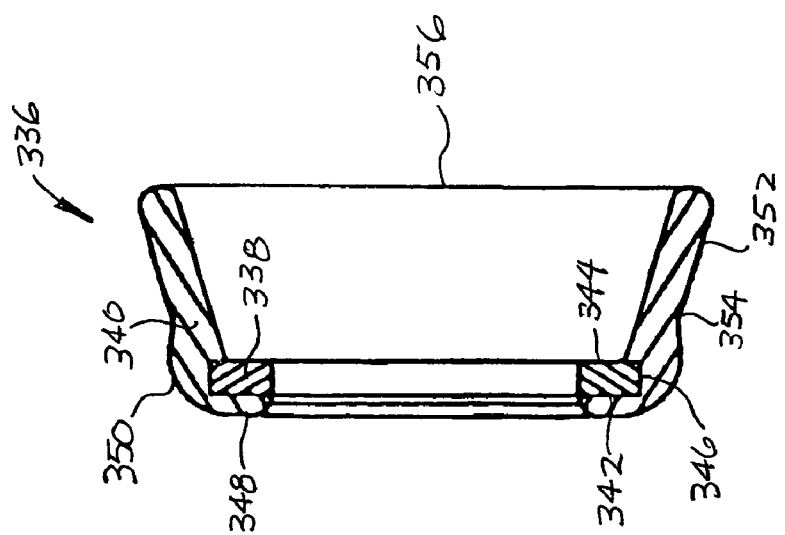
FIG. 9 is a sectional view of the sealing element of FIG. 8 as taken along line 9—9.
Figure 8:
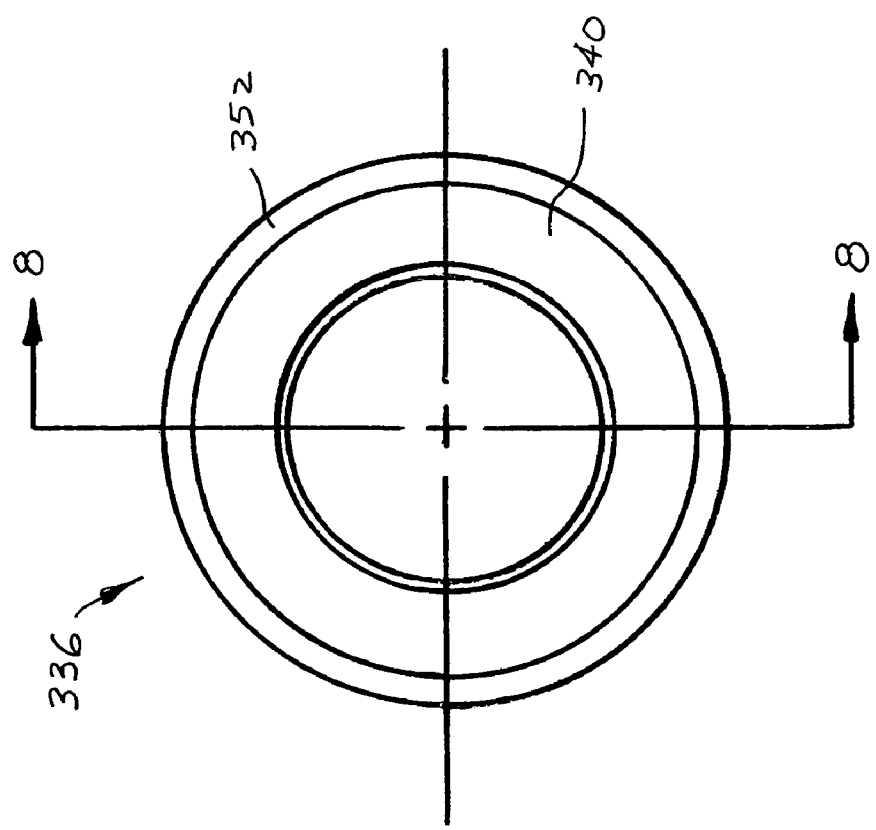
FIG. 8 is a front view of the sealing element of FIG. 4.

As illustrated in FIGS. 7–9, the sealing element 336 includes a rigid ring portion 338 and a resilient member portion 340 permanently attached to the rigid ring portion 338. For the purpose of describing the present invention, a "resilient" material is one that can be easily deformed by the radially inward force experienced by the resilient member portion when it is inserted into the flexible hose. Whereas, a "rigid" material can not be easily deformed by a compressive force and is generally able to retain it's shape under compression. Also for the purpose of describing the present invention, components that are "permanently attached" cannot be easily separated by hand and are not intended to be separated once they are attached. The resilient member portion 340 is permanently attached to the rigid ring portion 338 by either overmolding the resilient member portion 340 to the rigid ring portion 338 or by fusing the resilient member portion 340 to the rigid ring portion 338. The rigid ring portion 338 can be formed from a metallic material or from a rigid polymeric material. Examples of metallic materials suitable for forming the ring portion include but are not limited to brass, aluminum, steel and stainless steel. Examples of rigid polymeric materials suitable for forming the ring portion include but are not limited to glass filled 12-carbon polyamide and other types of polyamide.

The resilient member portion 340 has an annular portion 348 attached to an attachment end surface 342 of the ring portion 338. The annular portion 348 allows the resilient member portion 340 to have sufficient contact surface with the ring portion 338 to permanently attach the resilient member portion 340 to the ring portion 338. Extending axially from the annular portion 348 and located generally radially outward of the ring portion 338 is a bulge portion 350 of the resilient member portion 340. The radially inner surface of the bulge portion 350 is in direct contact with the radially outer surface 346 of the ring portion 338 to provide additional contact surface between the resilient member portion 340 and the ring portion 338. Extending axially from the bulge portion 350 is a conical skirt 352. The inner surface of the skirt 352 is shaped approximately the same as the outer surface of the lead-in portion 322 of the first bead 320. The outer surface of the resilient member portion 340 narrows radially inward at the transition of the bulge portion 350 and the skirt portion 352 to form a radially inward channel 354 circumferentially surrounding the outer surface of the resilient member portion 340. The thickness of the skirt 352 is approximately the same throughout its axial length.

The resilient member portion 340 can be formed from a polymeric material. Examples of polymeric materials suitable for forming the resilient member portion include but are not limited to fluorsilicone and vulcanized rubber.

The sealing element 336 is positioned over the end of the metal tubing 314 by inserting the lead-in portion 322 of the first bead 320 into an opening 356 defined by the skirt 352. The metal tubing 314 is further inserted into the opening 356 until the terminal end 315 of the metal tubing 314 abuts the abutment end surface 344 of the rigid ring portion 338. At this installed position, the skirt 352 is located radially outward of the end of the metal tubing 314. It is preferable that the skirt 352 is not tightly bound around the end of the metal tubing, but is rather loosely fit around metal tubing. This loose fit allows the expansion and contraction of the skirt and the metal tubing relative to each other without tearing the skirt.

To connect the flexible polymeric hose 318 to the hose connector 310, the end of the hose connector 310 is inserted into the hose 318. The hose 318 is then slid over sealing element 336. Since the outer diameter of the sealing element 336 is greater than the inner diameter of the hose 318, the hose 318 is expanded radially outward and the sealing element 336 is deformed radially inward to allow the hose 318 to be positioned radially outward of the sealing element 336. The hose connector 310 is inserted into the hose 318 until the hose 318 has slid beyond the second bead 326 to the position illustrated in FIG. 6. At this position, the bulge portion 350 of the resilient member portion 340, the first bead 320 and the second bead 326 of the metal tubing 314, along with the compressive force by the hose 318 on the outer surface of the hose connector 310, prevents the hose connector 310 from being pulled out of the hose 318. It is preferable that the pull out force of the hose connector 310 relative to hose 318 is at least 100 pounds. Once the hose connector 310 has been filly inserted into the hose 318, the sealing element 336 is seated axially relative to the metal tubing 314. The sealing element 336 is prevented from moving axially toward the hose connector 310 by the abutment of the ring portion 338 with the terminal end 315 of the metal tubing 314. The sealing element 336 is prevented from moving axially away from the hose connector 310 due to the high pull out force and the sealing element 336 sandwiched between the hose 318 and the metal tubing 314.

Figure 10:
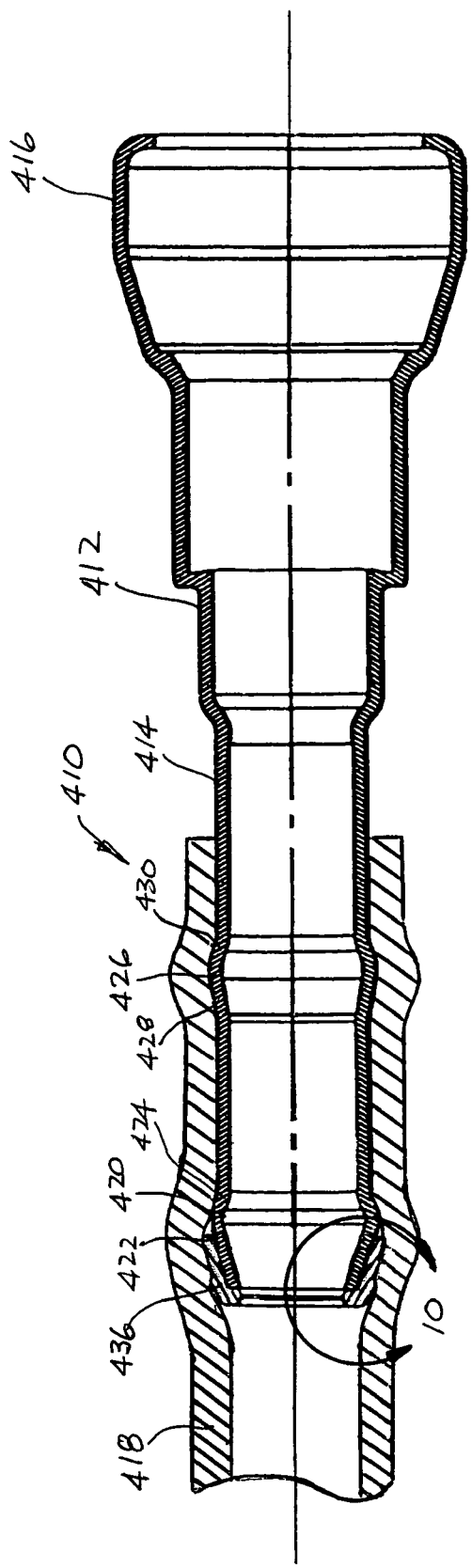
FIG. 10 is a sectional view of an alternative embodiment of a hose connector in accordance to the present invention.
Figure 11:
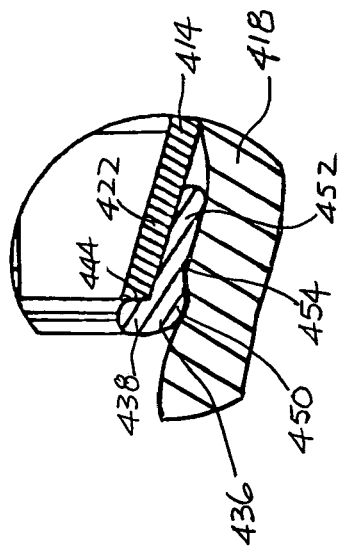
FIG. 11 is an enlarged view of FIG. 10 within circle 11.

An alternative embodiment of a hose connector in accordance to the present invention is illustrated in FIGS. 10 and 11. The hose connector 410 of the second embodiment includes a metal tubing 414 and a sealing element 436.

The metal tubing 414 of the second embodiment is identical to the metal tubing 314 of the first embodiment. As with the first embodiment, the metal tubing 414 of the second embodiment has a pair of radially outward extending beads 420, 426. Each bead 420, 426 has a lead-in portion 422, 428 and a slip-out preventive portion 424, 430. The other end of the connector body 412 is a female housing 416.

The sealing element 436 of the second embodiment is similar to the sealing element 336 of the first embodiment with the exception of the ring portion 438 and the resilient member portion 440 formed of the same resilient material, preferably a material disclosed for the first embodiment for forming the resilient member portion 340. The sealing element has a ring portion 438, a bulge portion 450 and a skirt 452. The ring portion 438 has an abutment end surface 444 adapted to abut the terminal end of the metal tubing 414 upon the sealing element 436 properly positioned over the end of the metal tubing 414. The bulge portion 450 extends radially outward and axially from the ring portion 438. The bulge portion 450, the first bend 420 and the second bead 426 of the metal tubing 414, along with the compressive force by the hose 418 on the outer surface of the hose connector 410, prevents the hose connector 410 from being pulled out of the hose 418. Extending axially from the bulge portion 450 is a conical skirt 452. The inner surface of the skirt 452 is shaped approximately the same as the outer surface of the lead-in portion 422 of the first bead 420. The outer surface of the sealing element 436 narrows radially inward at the transition of the bulge portion 450 and the skirt portion 452 to form a radially inward channel 454 circumferentially surrounding the outer surface of the resilient member portion 440. The thickness of the skirt 452 is approximately the same throughout its axial length.

Various features of the present invention have been described with reference to the above embodiments. It should be understood that modification may be made without departing from the spirit and scope of the invention as represented by the following claims.

The invention claimed is:

1. A hose connector adapted to connect to a flexible polymeric hose fitted on the outer periphery of the hose connector, the hose connector comprising:
   metal tubing having a terminal end portion and defining an outer hose receiving surface;
   a sealing element including a ring portion abutting the terminal end of said metal tubing, and a resilient member portion defining a skirt portion overlying a portion of said outer hose receiving surface wherein said ring portion is made of a material different from said resilient member portion and is overmolded or fused to said resilient member portion on a contact surface to permanently attach said resilient member portion to said ring portion;

wherein said ring portion is rigid; and wherein said resilient member portion includes a bulge portion, said rigid ring portion is located radially inward of said bulge portion and includes a radially outer surface with said bulge portion in direct contact with said radially outer surface of said ring portion and said bulge portion extending radially outwardly from said radially outer surface of said ring portion.

2. A hose connector adapted to connect to a flexible polymeric hose fitted on the outer periphery of the hose connector, the hose connector comprising:

metal tubing having a radial terminal end portion and defining an outer hose receiving surface; and a sealing element including a rigid ring portion defining a radial abutment end surface abutting the radial terminal end of said metal tubing, and a resilient member portion defining a skirt portion overlying a portion of said outer hose receiving surface wherein said ring portion is made of a material different from said resilient member portion and is overmolded or fused to said resilient member portion on a contact surface to permanently attach said resilient member portion to said ring portion wherein said skirt is located immediately radially outward of said end portion of said metal tube, and wherein said ring portion includes an attachment end surface opposite said radial abutment surface and said resilient portion is attached to said attachment end surface.

3. The hose connector as claimed in claim 1 wherein said resilient member includes an annular portion and said ring portion includes an attachment end surface with said annular portion in contact with and attached to said attachment end surface of said ring portion.

4. The hose connector as claimed in claim 3 wherein said bulge portion and said skirt portion define a transition that narrows radially inward defining a radially inward channel circumferentially surrounding the outer surface of said resilient member portion.

5. A hose connector adapted to have a flexible polymeric hose fitted on the outer periphery of the hose connector, the hose connector comprising:

a metal tubing having a terminal end portion and defining an outer hose receiving surface;

a sealing element surrounding the terminal end of said metal tubing, wherein said sealing element includes a rigid ring portion and a resilient member portion defining a skirt, said ring portion abuts the terminal end of said metal tubing, said resilient skirt is positioned in overlying relation to said tube receiving surface of said metal tubing;

a flexible polymeric hose is connected to said metal tube in overlying relation to said outer hose receiving surface with said sealing element in sealing contact with said hose and said metal tube; and wherein said resilient member portion of said sealing element includes a bulge portion extending radially outwardly from said ring portion said rigid ring portion includes a radially outer surface with said bulge portion in direct contact with said radially outer surface of said ring portion and said bulge portion extends radially outward of said radially outer surface of said ring portion.

6. The hose connector as claimed in claim 5 wherein said skirt is conical in shape.

7. The hose connector as claimed in claim 5 wherein said ring portion is made of a material different from said resilient member portion and is overmolded or fused to said resilient member portion on a contact surface to permanently attach and resilient member portion to said ring portion.

8. The hose connector as claimed in claim 7 wherein said skirt portion made of polymeric material is fluorsilicone.

9. The hose connector as claimed in claim 7 wherein said skirt portion made of polymeric material is rubber.

10. A hose connection as claimed in claim 7 wherein said resilient member portion includes an annular portion, said rigid ring portion is located radially inward of said annular portion and includes an attachment end surface with said annular portion attached to said attachment end surface of said ring portion, and wherein said bulge portion and said skirt portion define a transition that narrows radially inward defining a radially inward channel circumferentially surrounding the outer surface of said resilient member portion.

* * * * *